United States Patent
Engelen et al.

(10) Patent No.: US 11,035,409 B2
(45) Date of Patent: Jun. 15, 2021

(54) BEARING UNIT WITH RETAINING CAGE

(71) Applicant: Aktiebolaget SKF, Gothenburg (SE)

(72) Inventors: Philip Engelen, Utrecht (NL); William Finetti, La Loggia (IT); Francesco Lamboglia, Pinerolo (IT); Giorgio Missiaggia, Trieste (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 16/601,961

(22) Filed: Oct. 15, 2019

(65) Prior Publication Data
US 2020/0132119 A1    Apr. 30, 2020

(30) Foreign Application Priority Data

Oct. 24, 2018 (IT) .......................... 102018000009709

(51) Int. Cl.
*F16C 33/41* (2006.01)
*F16C 33/40* (2006.01)
*F16C 19/18* (2006.01)

(52) U.S. Cl.
CPC .............. *F16C 33/40* (2013.01); *F16C 19/18* (2013.01)

(58) Field of Classification Search
CPC .... F16C 19/163; F16C 19/166; F16C 19/186; F16C 33/40; F16C 33/41; F16C 33/412; F16C 33/414; F16C 33/416; F16C 33/418; F16C 33/3856
See application file for complete search history.

(56) References Cited

U.S. PATENT DOCUMENTS

| 4,133,588 A | 1/1979 | Earsley |
| 8,591,115 B2 | 11/2013 | Mori |
| 2004/0057644 A1* | 3/2004 | Meeker ................ F16C 19/186 384/470 |
| 2007/0189651 A1 | 8/2007 | Haepp |
| 2007/0206893 A1* | 9/2007 | Felis ..................... F16C 19/163 384/528 |

(Continued)

FOREIGN PATENT DOCUMENTS

| DE | 102008059571 A1 | 6/2010 | |
| DE | 102016202670 A1 * | 8/2017 | ............ F16C 43/083 |

(Continued)

OTHER PUBLICATIONS

Search Report and Written Opinion of corresponding Italian Application No. 102018000009709 dated Jul. 4, 2019.

*Primary Examiner* — Phillip A Johnson
(74) *Attorney, Agent, or Firm* — Reed Smith LLP

(57) ABSTRACT

A bearing unit having at least one row of rolling bodies; and at least one cage for retaining a respective one of the at least one row of rolling bodies. The at least one cage comprising at least one base bar, a plurality of arms circumferentially spaced apart and extending from one side of the base bar, and a plurality of partially spherical cavities for retaining the respective one of the at least one row of rolling bodies. The respective row of rolling bodies and the at least one cage are in contact with each other along contact points positioned near a polar region of the respective one of the at least one row of rolling bodies, so that an angular distance (α) of the contact points with respect to an equator of the respective one of the at least one row of rolling bodies is between 40° and 75°.

15 Claims, 7 Drawing Sheets

(56) References Cited

U.S. PATENT DOCUMENTS

2012/0087612 A1* 4/2012 Maeda ................. F16C 33/418
384/527

FOREIGN PATENT DOCUMENTS

| | | | |
|---|---|---|---|
| EP | 0592839 | 4/1994 | |
| FR | 2972034 | 8/2012 | |
| JP | 2003004047 A | 1/2003 | |
| JP | 2003314557 A * | 11/2003 | ............ F16C 33/418 |
| JP | 2009138863 A * | 6/2009 | .......... F16C 33/6696 |
| JP | 2010196801 A * | 9/2010 | ............ F16C 33/418 |
| JP | 2013029144 | 2/2013 | |
| JP | 2013068249 | 4/2013 | |
| JP | 2017125560 A * | 7/2017 | ............ F16C 33/416 |
| WO | WO-2006027342 A1 * | 3/2006 | ............ F16C 19/186 |

* cited by examiner

BEARING UNIT WITH RETAINING CAGE

CROSS-REFERENCE TO RELATED APPLICATION

This application is based on and claims priority under 35 U.S.C. § 119 to Italian Application No. 102018000009709, filed Oct. 24, 2018, the entire contents of which are incorporated herein by reference.

TECHNICAL FIELD

This disclosure is generally directed to a bearing technology, and in particular, although not exclusively, for a wheel hub assemblies of motor vehicles.

BACKGROUND

A conventional cage for rolling bodies, in particular balls, of a bearing unit is formed by a circular base bar and a plurality of arms spaced circumferentially and extending from one side of the bar. The base bar and the arms have partially spherical concave surfaces defining together a plurality of partially spherical pockets or cavities for retaining respective balls.

The bar is a continuous structural element, which extends circumferentially along the cage and forms a solid base so as to provide the cage overall with the necessary rigidity for keeping the balls of each row circumferentially equally spaced along the raceways of a bearing.

The contact which occurs between the ball and the cage is at present provided in the equatorial region of the ball which is in contact with suitable bumps formed on the cage. As a result of the rolling movement of the balls with respect to the raceways of the inner and outer rings of the bearing unit, the relative movement of the ball and cage is more or less a sliding movement, namely a displacement of the equatorial zone of the ball with respect to the bumps on the cage The contact surface area between the two components which is formed in the equatorial zone of the ball is the maximum which can be formed geometrically. Moreover, the tangential speeds of the contact points of the ball are also maximum in nature since these points assume the maximum distance (practically equal to the radius of the ball) with respect to the rotation axis of the said ball. Consequently, such a sliding movement gives rise to very high sliding friction which is theoretically the maximum which can be produced. A high sliding friction between cage and ball obviously results in a greater dissipation of energy in the form of a heat flow.

The known solutions, however, do not solve the technical problems mentioned: since there is still contact between the cage and ball in the equatorial zone of the said ball, the relative tangential speeds are in any case high as is the consequent heat dissipation.

DETAILED DESCRIPTION

Figure 1:
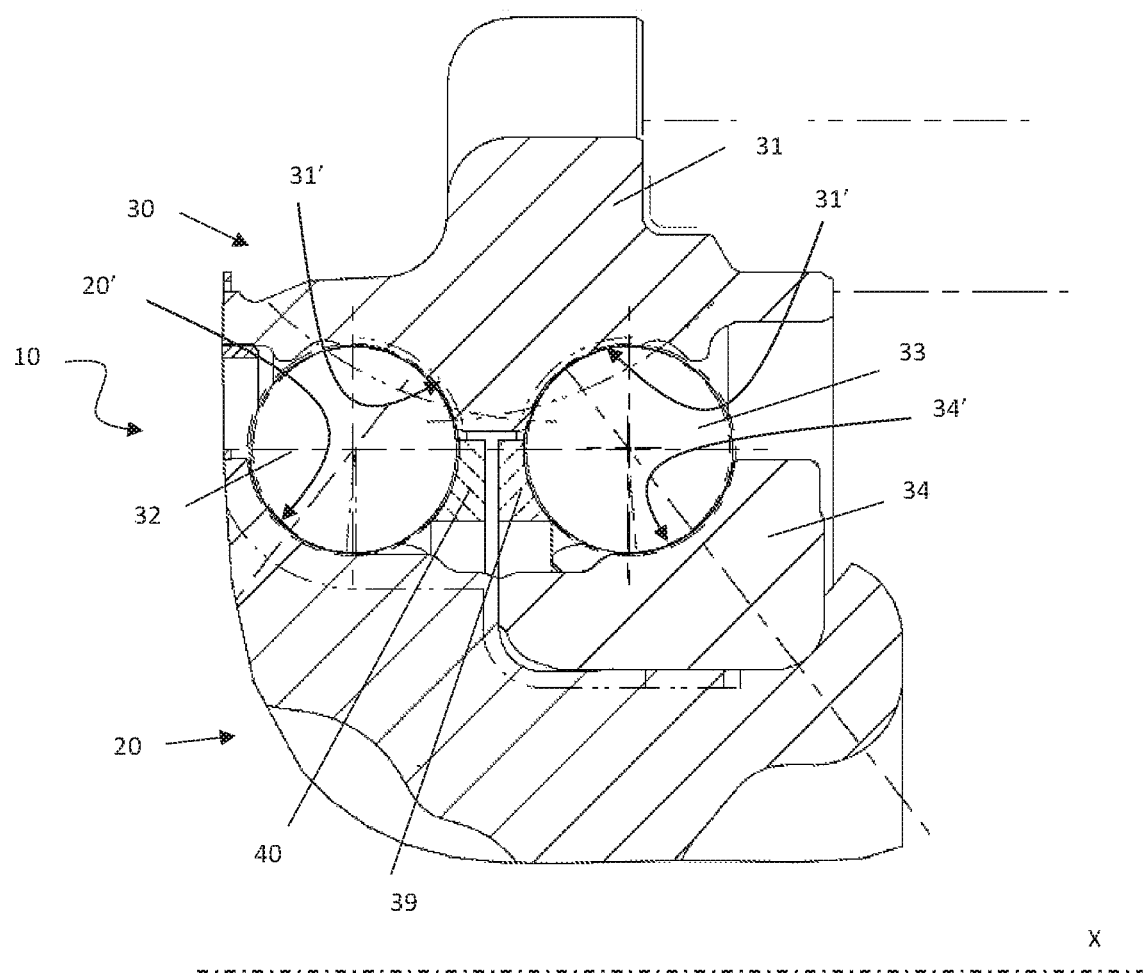
FIG. 1 is a partial cross-section through a bearing unit provided with two cages for containing and retaining balls.

A retaining cage in accordance with this disclosure is suitable for bearing units, in particular rolling bearings. The exemplary embodiments disclosed herein are suitable in particular, although not exclusively, for the wheel hub assemblies of motor vehicles, said assemblies being provided with a bearing unit. These applications comprise both the case where the outer ring of the bearing unit is rotating, while the inner ring of the bearing unit is fixed, and the opposite case where the inner ring rotates and the outer ring is fixed. The exemplary embodiments disclosed herein are applicable, advantageously but not exclusively, to a bearing unit having a double row of balls.

The inventive concepts of example embodiments disclosed herein are directed to overcoming these drawbacks and deficiencies in an attempt to optimize the contact zone between ball and cage.

There exists the need to design a cage for rolling bodies (in particular balls) of bearing units, which does not have the aforementioned drawbacks. For example, conventional technology such as DE 102008059571A1 shows the drawing of a cage in which a dividing wall forms an optimized support surface for the equatorial zone of the ball.

Another example is illustrated by the document JP 2003004047(A) where the area of contact between the cage and the balls is reduced, forming on the cage a plurality of protrusions in contact with the balls.

Similarly, in the document U.S. Pat. No. 4,133,588 A whereby the inner surface of the cage is provided with projections having different configurations which define engaging surfaces for the ball, and which have an effective diameter slightly greater than that of the balls so as to provide a minimum play with the balls.

Exemplary embodiments disclosed herein solve the need in the conventional technology to reduce the sliding friction force, which occurs between the said cage and the rolling bodies and, consequently also reduce the heat flow, which is dissipated.

Exemplary embodiments disclosed herein reduce the friction between rolling bodies, for example balls, and cages of bearing units for wheel hub assemblies. This may be achieved by reducing and displacing the contact points between balls and cages, and in particular displacing the contact point towards the polar region of the ball, thus reducing the relative sliding speeds of the contact points of the ball with respect to the cage and consequently the sliding friction.

Purely by way of a non-limiting example, inventive concepts of exemplary embodiments will now be described with reference to a wheel hub assembly for motor vehicles, provided with a rolling bearing.

With reference to FIG. 1, a wheel hub assembly in accordance with exemplary embodiments is denoted overall by 10. The figure shows a detail of the configuration provided by way of example.

The assembly 10 comprises a central rotation axis X, a hub 20 which—may be stationary, and a bearing unit 30 in turn comprising: a radially outer ring 31 which—may be rotatable; a radially inner ring 20 defined by the hub 20; a further, stationary, radially inner ring 34 mounted on and integral with the hub 20; two rows of rolling bodies 32, 33; and two cages 39 and 40. The two rolling bodies 32, 33, which may be in spherical ball configuration, may be arranged between the radially outer ring 31 and the radially inner rings 20 and 34. The two cages 39 and 40 may be configured to keep in position the rolling bodies of the two rows of rolling bodies 32, 33.

In the whole of the present description and in the claims, the terms and expressions indicating positions and orientations such as "radial" and "axial" are understood as referring to the central axis of rotation X of the bearing unit 30. Expressions such as "axially outer" and "axially inner" refer instead to the assembled condition of the wheel hub unit and, in the specific case, preferably refer to a wheel side and, respectively, to a side opposite to the wheel side.

The radially outer ring 31 is provided with two respective radially outer raceways 31', while the radially inner rings 20, 34 are provided with respective radially inner raceways 20', 34' for allowing rolling of the axially outer row of rolling bodies 32 arranged between the radially outer ring 31 and the hub 20 and the axially inner row of rolling bodies 33 between the radially outer ring 31 and the radially inner ring 34. For the sake of easier illustration the reference numbers 32 and 33 will be attributed both to the single balls and to the rows of balls. Again for the sake of simplicity, the term "ball" may be used by way of a non-limiting example in the present description and in the attached drawings instead of the more generic term "rolling body" (and likewise the same reference numbers will also be used).

Figure 2:
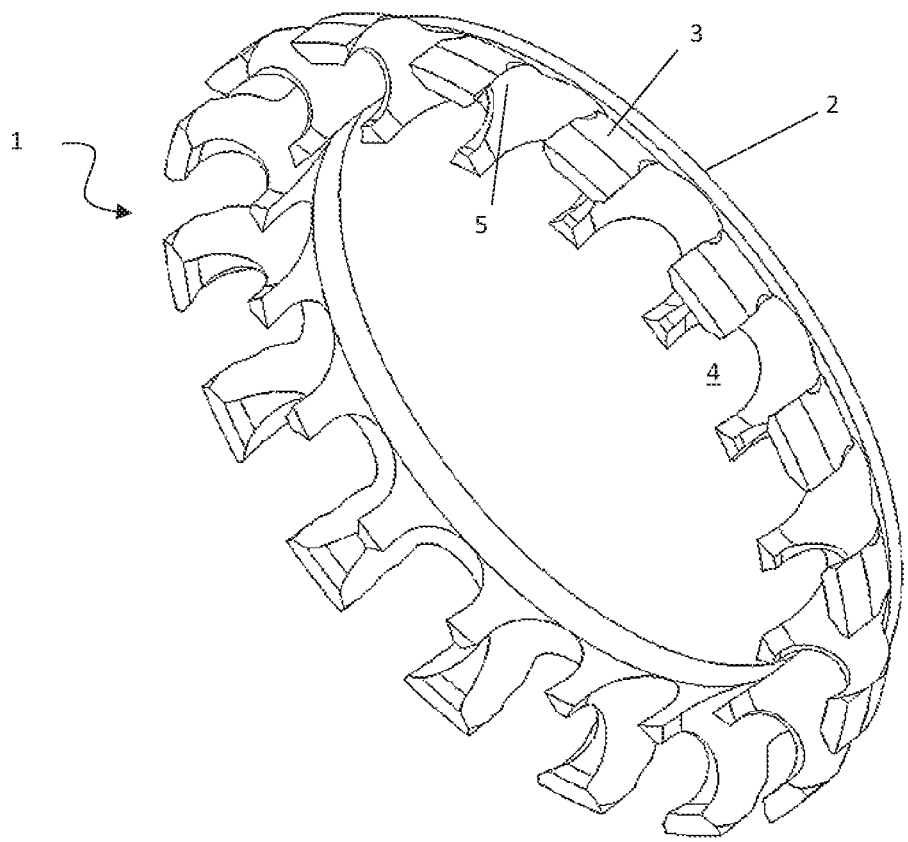
FIG. 2 is an axonometric view of a cage for rolling bodies.

In order to simplify the description below and highlight even further how the cages 39 and 40 are in in accordance with this disclosure, reference will now be made to FIG. 2 showing a cage 1 comprising a circular base bar 2 and a plurality of arms 3 spaced circumferentially and extending from one side of the bar 2. The base bar 2 and the arms 3 have partially spherical concave surfaces defining together a plurality of partially spherical pockets or cavities 4 for retaining respective balls by means of contact zones 5.

Figure 3:
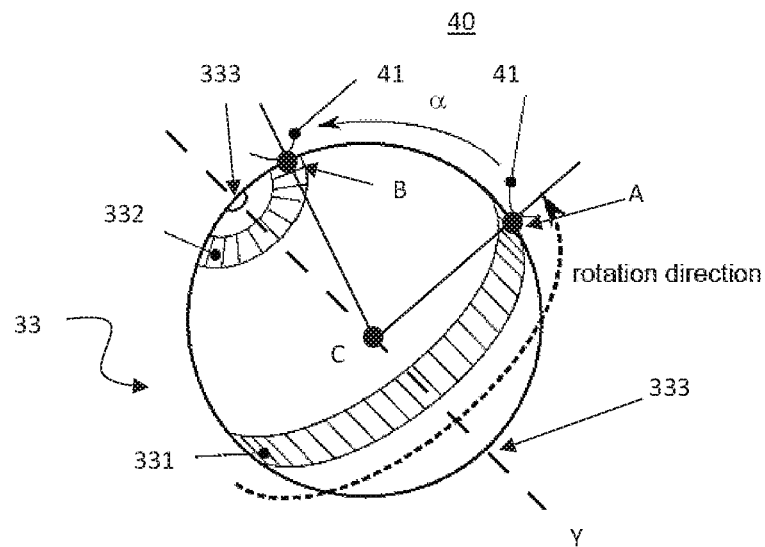
FIG. 3 is an axonometric view of a ball for a bearing unit on which the points of contact with a retaining cage in accordance with this disclosure.

FIG. 3 shows in schematic form a ball 33 for a bearing unit, for example the bearing unit 30 in FIG. 1. The ball 33, as well as all the balls 33 of the bearing unit 30, as a result of the relative rotary movement of the inner ring and outer ring of the bearing unit 30, and therefore of the respective raceways, rolls about its own rotation Y-axis in the direction indicated by means of a broken line in FIG. 3 and the wording "rotation direction".

In the case where the ball 33 is positioned in a cage 1, as shown in FIG. 2, the ball 33 comes into contact with the cage 1 by means of contact points 41 positioned along an equatorial region 331 arranged around the Y-axis and perpendicular to the Y-axis. On the other hand, when the ball 33, and likewise all the balls 33 of the bearing unit 30, is/are positioned inside a retaining cage 39, 40 (not shown in the Figure) in accordance with exemplary embodiments, the ball 33 comes into contact with the cage 39, 40 at contact points 41 positioned along a polar region 332 arranged around the Y-axis parallel to the equatorial region 331, but close to a pole 333 of the ball 33.

In fact, as mentioned, exemplary embodiments reduce the sliding friction between the cage and the ball by positioning the ideal contact points in the polar region 332 of the ball 33, namely close to the poles 333 of the sphere forming the ball 33.

In order to understand the potential advantages of concepts disclosed herein, it is possible to define an angle α subtended by a straight half line CA having its origin in the centre C of the ball 33 and passing through a point A of the outer surface of the ball and forming part of the equatorial region 331 and by a straight half line CB having its origin in the centre C of the ball 33, and passing through a point B of the outer surface of the ball and forming part of the polar region 332. In other words, the angle α represents an angular distance a of the contact points 41 with respect to an equator of the rolling bodies 32, 33.

In embodiments, the relative tangential sliding speed of the cage and ball is reduced by a factor corresponding to the cosine of the angle α, as defined above. In the same proportion the consequent sliding friction between ball and cage is reduced.

In order to obtain the maximum benefit as regards the reduction of the friction and at the same time ensure the ball retaining performance, the cage 40 should have some specific characteristic features.

Firstly, the contact point between ball and cage should be as close as possible to one of the two poles 333 of the ball. However, in order to be able to absorb the forces in the direction of rotation of the bearing and maintain the distance between each ball during operation, the contact points and the consequent polar regions 332 must be positioned slightly below the poles 333. A preferred positioning arrangement, as obtained from experimental tests carried out, which optimizes the "friction reduction/performance guarantee" trade-off, may be defined by a range of possible values of the angle α, as defined above, ranging between 40° and 75°, namely $$40° < \alpha < 75°$$

Figure 4:
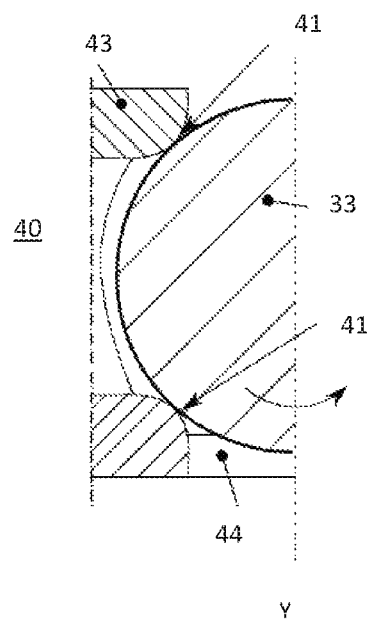
FIG. 4 shows a partial cross-section of the detail of the contact points between cage and ball.
Figure 5:
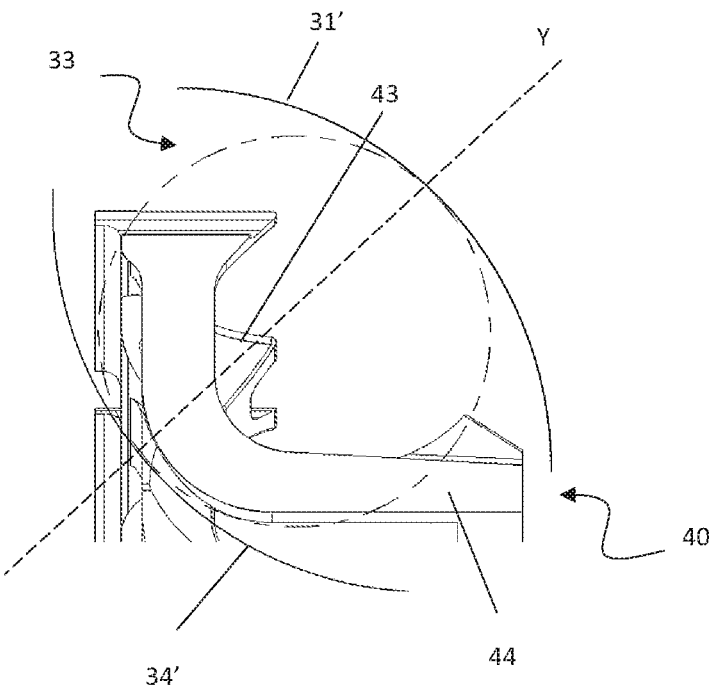
FIG. 5 is a front view of the cage and its cage bar.

With reference to FIGS. 4 and 5, the contact points 41 should be reduced to the smallest number possible to ensure that contact occurs only in the polar regions 332 as predefined. The minimum number of points for containing the ball in the direction of rotation of the bearing and for ensuring contact only in the polar region is four per ball, namely two on each hemisphere, as can be seen in FIGS. 4 and 5. For each hemisphere, advantageously, the contact points 41 are symmetrical with respect to the rotation axis of the ball. All the other geometric characteristics are designed to ensure the maximum space between cage and ball.

Figure 6:
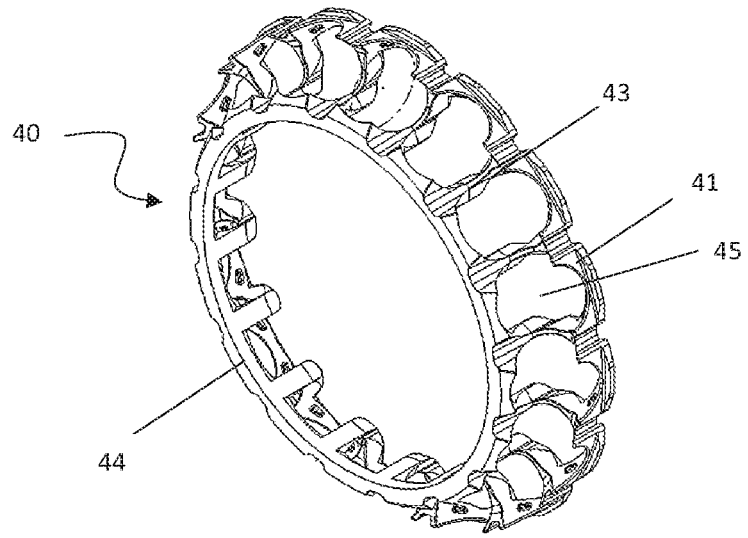
FIG. 6 is an axonometric view of a cage for rolling bodies, in accordance with this disclosure.

FIG. 6 shows a three-dimensional view of the entire cage 40 in accordance with this disclosure. The cage comprises a base bar 44 and a plurality of arms 43 spaced circumferentially and extending from one side of the bar. The base bar and the arms have partially spherical concave surfaces defining together a plurality of partially spherical pockets or cavities 45 for retaining respective balls by means of contact points 41.

In order to contain the maximum number of balls, the material of the cage is removed around the minimum distance between two adjacent balls and in this way the geometry of the arms 43 will have a C-shaped form.

In order to connect the arms 43 of the cage 40, a bar 44 arranged circumferentially will be used. In order to facilitate manufacture and reduce the weight, the bar is positioned on the inner circumference of the cage, as can be seen in FIG. 6. Advantageously, for structural strength requirements, the cage is also provided with an outer bar.

The following figures, which are details of the preceding FIG. 6, show exemplary dimensions of a new cage in accordance with this disclosure.

Figure 9:
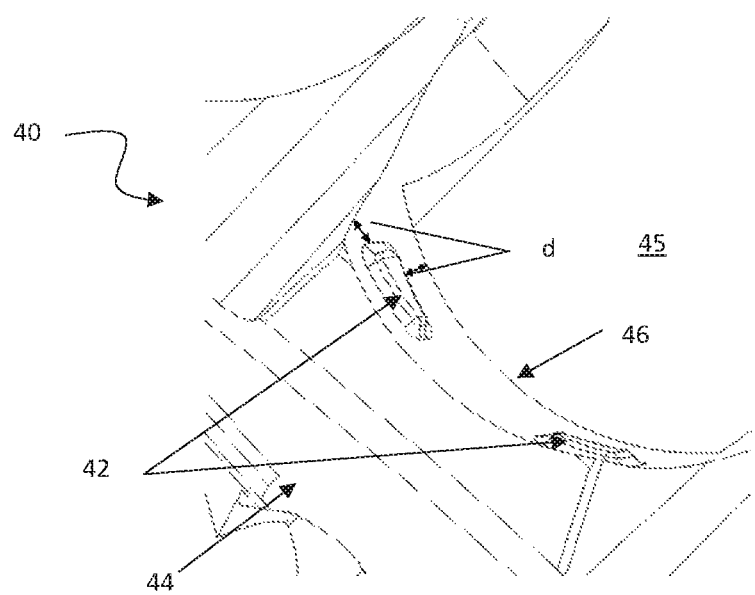
FIG. 9 is a third detail of the pocket of the cage according to FIG. 6 which shows the position of the points of contact with respect to the edges of the spherical surface of the cage.

The ideal contact points 41 between ball and cage in reality are formed by bumps 42, which extend radially towards the inside of the partially spherical cavity, or pocket, 45. As discussed above, a pair of radially outer bumps 42' and a pair of radially inner bumps 42" may be present. The bumps, as can be seen in FIG. 9, are formed on spherical surfaces 46, which delimit the partially spherical cavity 45 of the cage 39, 40. Preferably, the bumps 42 formed on the cage must have a surface area, which is as small as possible. The bumps 42 may have a curvilinear form in order to reduce the contact area and have a more definite contact zone in the polar region 332 of the balls 33 (as can be seen in FIG. 4).

Figure 7:
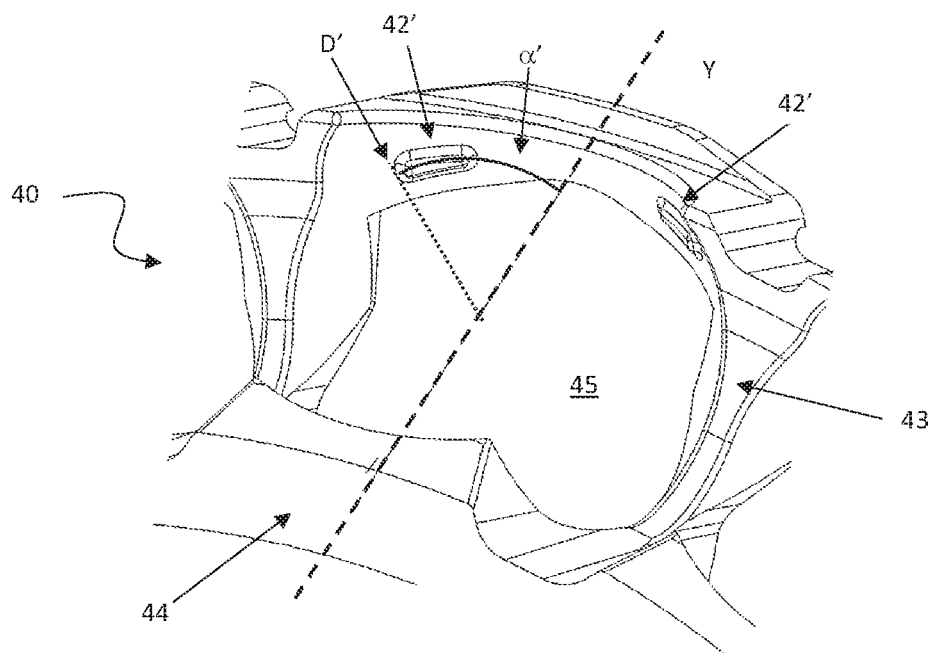
FIG. 7 is a first detail of a pocket of the cage according to FIG. 6 which shows the angular position of the radially outer contact points (bumps)

FIG. 7 shows the contact zone between cage and ball formed by radially outer bumps 42', symmetrical with each other relative to the rotation Y-axis of the ball (not shown in the figure) inserted inside the respective pocket 45. FIG. 7 also shows the angular position of the bump 42', measured by the angle $\alpha'$ between the rotation Y-axis and the distal edge D' of the bump 42' with respect to the Y-axis. The angle $\alpha'$ may preferably vary between 15° (degrees) and 50°, where the angular extension of the bump 42' is equal to about 15°.

Figure 8:
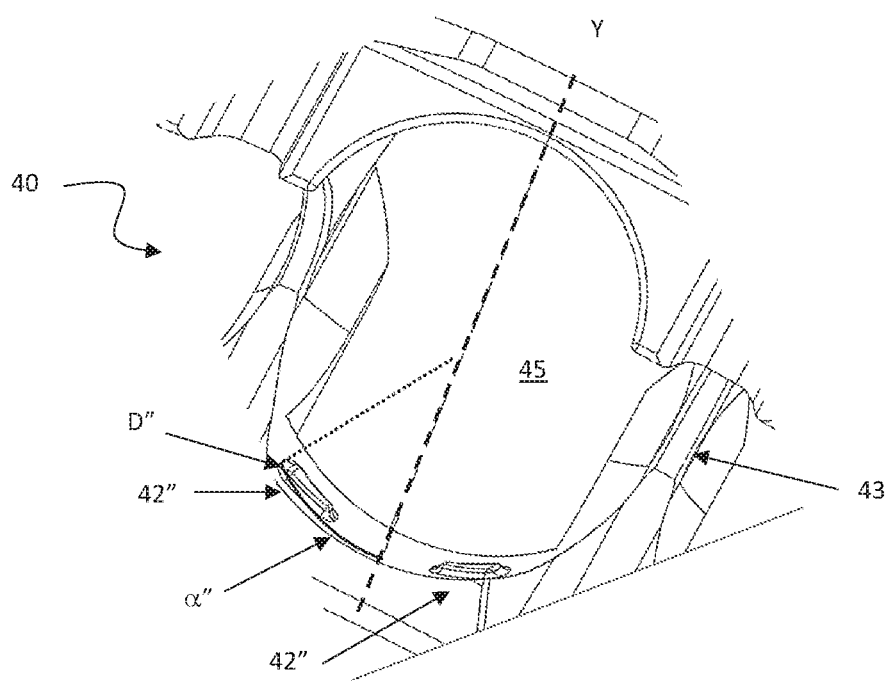
FIG. 8 is a second detail of the pocket of the cage according to FIG. 6 which shows the angular position of the radially inner contact points (bumps)

FIG. 8 shows instead the contact zone between cage and ball formed by the radially inner bumps 42", which are also symmetrical with respect to the rotation of Y-axis of the ball. The angular position of the bump 42" is measured by the angle $\alpha''$ between the rotation axis Y and the distal edge D" of the bump 42" with respect to the Y-axis. The angle $\alpha''$ may preferably vary between 15° and 45°, where the angular extension of the bump 42' may also be equal to about 15°.

Figure 10:
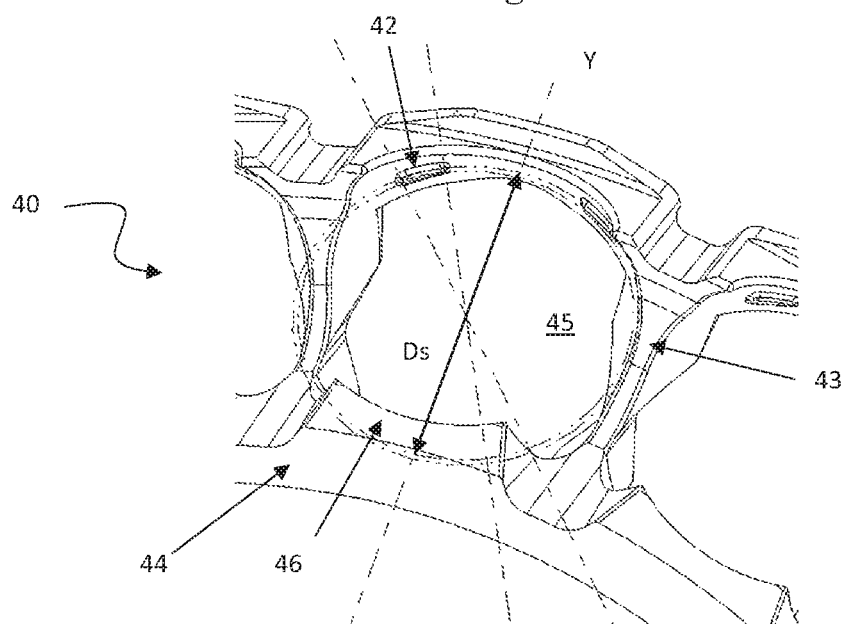
FIG. 10 is a fourth detail of the pocket of the cage according to FIG. 6 which shows the dimensions of the spherical surface of the cage.

The bumps 42 may be formed, for example, by means of the same method for moulding the cage 40. In particular, the bumps are made by forming by means of electrical discharge machining their negative form inside the mould. In order to satisfy functional and technological requirements, with reference to FIG. 9, the distance "d" of the bumps 42 from the edges of a spherical surface 46, which delimits the pocket 45, should be between 0.15 mm (millimetre) and 3 mm and preferably should have a value of 0.5 mm. The height of the bump 42 with respect to the spherical surface 46, in other words the thickness of the bump, may have values of between 0.05 mm and 0.5 mm. With reference to FIG. 10, the diameter Ds of the spherical surface 46 will be greater than the diameter of the respective ball 33 inserted inside the pocket 45 by up to a maximum of 2.5 mm.

Figure 11:
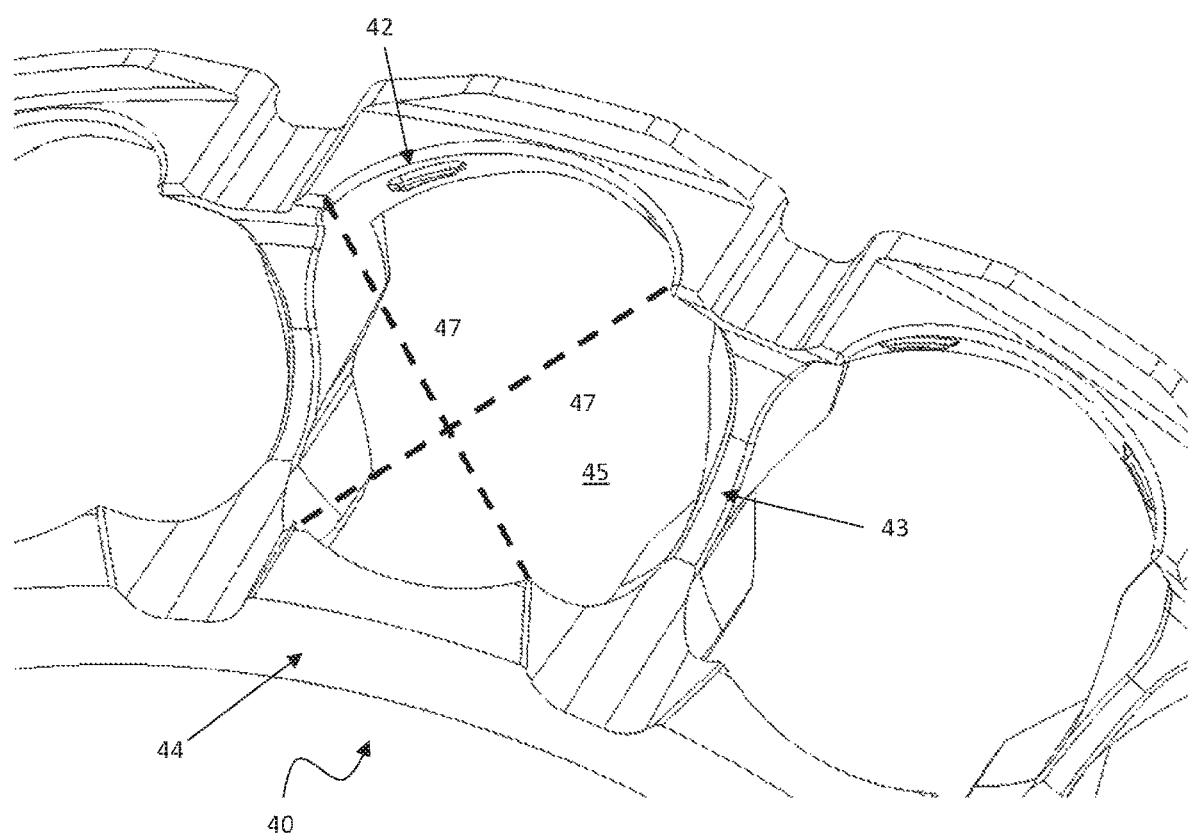
FIG. 11 is a fifth detail of the pocket of the cage according to FIG. 6 which shows the dimensions of the minimum inlet edges for entry of a ball inside the said pocket.

Finally and with reference to FIG. 11, the pocket 45 has chords 47, which form the inlet edges of the lower end useful for retaining the balls. The chords 47 may have a length not greater than the diameter of the respective ball and not smaller than the diameter of the ball by more than 3 mm.

Upon reading this disclosure, it well be understood by one skilled in the art that numerous further variants are possible. It will also be understood that said that exemplary embodiments herein are only intended as examples and do not limit the subject of this disclosure, nor its applications, nor its possible configurations. On the contrary, although the description provided above enables the person skilled in the art to implement techniques in accordance with this disclosure, one will appreciate that numerous variations of the components described are feasible, without thereby departing from the scope of the invention, as defined in the accompanying claims, interpreted literally and/or in accordance with their legal equivalents.

According to interrelated exemplary embodiments, the contact zone between ball and cage, which could ideally coincide with the poles of the sphere forming the ball, in order for it to be functionally effective so as to ensure the retention of the balls and industrially realizable, must be limited within a predetermined range, which can be defined for example as being the range within which an angular distance of the contact points with respect to an equator of the rolling bodies lies.

Also the contact points formed on the cage, the so-called "bumps" must have a geometry, which is fully optimized so as to obtain a contact surface which is as small as possible, but which at the same time effectively retains the balls and can be industrially realized.

In interrelated exemplary embodiments, the overall design of the cage must be optimized in the form of the arms, so that moulding of the cage is feasible and economically sustainable.

Therefore, in embodiments, an innovative cage for rolling bodies of a bearing unit, for example, of a wheel hub unit, is described, the cage having the characteristic features described in the independent claim which is attached to the present description.

Further preferred and/or particularly advantageous of exemplary embodiments of inventive concepts are described in accordance with the characteristic features indicated in the attached dependent claims.

What is claimed is:

1. A bearing unit comprising:
at least one row of rolling bodies; and
at least one cage for retaining a respective one of the at least one row of rolling bodies, the at least one cage comprising at least one base bar; a plurality of arms circumferentially spaced apart and extending from one side of the base bar; and a plurality of partially spherical cavities for retaining the respective one of the at least one row of rolling bodies,
wherein the respective one of the at least one row of rolling bodies and the at least one cage are in contact with each other along contact points positioned near a polar region of the respective one of the at least one row of rolling bodies, so that an angular distance ($\alpha$) of the contact points with respect to an equator of the respective one of the at least one row of rolling bodies is between 40° and 75°.

2. The bearing unit of claim 1, wherein the contact points between the respective one of the at least one row of rolling bodies and the at least one cage consist of bumps, the bumps are radially outward facing bumps and radially inward facing bumps, the bumps are formed in the partially spherical cavities of the at least one cage and extend radially towards an inside of the partially spherical cavities.

3. The bearing unit of claim 2, wherein the radially outward facing bumps are symmetrical with respect to a rotation axis (Y) of the respective one of the at least one row of rolling bodies, and have an angular position measured by an angle ($\alpha'$) between the rotation axis (Y) and a distal edge (D') of a respective one of the radially outward facing bump) with respect to the rotation axis (Y), the rotation axis (Y) is in a range between 15° and 50°.

4. The bearing unit of claim 2, wherein the radially inward facing bumps are symmetrical with respect to a rotation axis (Y) of the respective one of the at least one row of rolling bodies, and have an angular position measured by an angle (α") between the rotation axis (Y) and a distal edge (D") of the radially inward facing bump with respect to the rotation axis (Y), the rotation axis (Y) is in a range between 15° and 45°.

5. The bearing unit of claim 2, wherein
the outward facing bumps include an angular extension of fifteen degrees (15°), and
the inward facing bumps include an angular extension of fifteen degrees (15°).

6. The bearing unit of claim 2, wherein the bumps and edges of a spherical surface are spaced apart by a distance of 0.15 mm (millimeter) and 3 mm, the spherical surface delimits the partially spherical cavity.

7. The bearing unit of claim 6, wherein a thickness of the bumps with respect to the spherical surface has a value of between 0.05 mm and 0.5 mm.

8. The bearing unit claim 6, wherein a difference between diameter of the spherical surface and diameter of the respective one of the at least one row of rolling bodies inserted inside the partially spherical cavity is less than 2.5 mm.

9. The bearing unit of claim 1, wherein the a respective one of the plurality of partially spherical cavities comprises chords, the chords form inlet edges of a lower end for retaining respective one of the at least one row of rolling bodies, the chords comprise a length having a value between the diameter of the respective one of the at least one row of rolling bodies and the diameter of the respective one of the at least one row of rolling bodies reduced by 3 mm.

10. A wheel hub assembly for motor vehicles, comprising:
a hub; and
a bearing unit comprising,
  a radially outer ring provided with a respective radially outer raceway,
  at least one radially inner ring provided with a respective radially inner raceway,
  at least one row of rolling bodies between the radially outer ring and the at least one radially inner ring, and
  at least one cage for retaining the at least one row of rolling bodies;
  wherein the at least one cage is configured for retaining a respective one of the at least one row of rolling bodies;
  wherein the at least one cage comprises a plurality of arms circumferentially spaced apart and extending from one side of a base bar, the cage defining partially spherical cavities for retaining the respective one of the at least one row of rolling bodies;
  wherein the partially spherical cavities comprise chords;
  wherein the chords form inlet edges of a lower end for retaining respective one of the at least one row of rolling bodies;
  wherein the chords further comprise a length having a value between the diameter of the respective one of the at least one row of rolling bodies and the diameter of the respective one of the at least one row of rolling bodies reduced by 3 mm.

11. A wheel hub assembly for motor vehicles, comprising:
a hub; and
a bearing unit comprising,
  a radially outer ring provided with a respective radially outer raceway,
  at least one radially inner ring provided with a respective radially inner raceway,
  at least one row of rolling bodies between the radially outer ring and the at least one radially inner ring, and
  at least one cage for retaining the at least one row of rolling bodies,
  wherein a respective one of the at least one row of rolling bodies and the at least one cage are in contact with each other along contact points positioned near a polar region of the respective one of the at least one row of rolling bodies, so that an angular distance (α) of the contact points with respect to an equator of the respective one of the at least one row of rolling bodies is between 40° and 75°.

12. The wheel hub assembly for motor vehicles of claim 11,
wherein the contact points between the respective one of the at least one row of rolling bodies and the at least one cage consist of bumps, the bumps are radially outward facing bumps and radially inward facing bumps, the bumps are formed in the partially spherical cavities of the at least one cage and extend radially towards an inside of the partially spherical cavities;
wherein the outward facing bumps include an angular extension of fifteen degrees (15°), and the inward facing bumps include an angular extension of fifteen degrees (15°).

13. The wheel hub assembly for motor vehicles of claim 12, wherein the bumps and edges of a spherical surface are spaced apart by a distance of 0.15 mm (millimeter) and 3 mm, the spherical surface delimits the partially spherical cavity.

14. The bearing unit of claim 13, wherein thickness of the bumps with respect to the spherical surface has a value of between 0.05 mm and 0.5 mm.

15. A bearing unit comprising:
at least one row of rolling bodies; and
at least one cage for retaining a respective one of the at least one row of rolling bodies, the at least one cage comprising at least one base bar a plurality of arms circumferentially spaced apart and extending from one side of the base bar; and a plurality of partially spherical cavities for retaining the respective one of the at least one row of rolling bodies,
wherein the respective one of the at least one row of rolling bodies and the at least one cage are in contact with each other along contact points positioned near a polar region of the respective one of the at least one row of rolling bodies, so that an angular distance (a) of the contact points with respect to an equator of the respective one of the at least one row of rolling bodies is between 40° and 75°,
wherein the contact points between the respective one of the at least one row of rolling bodies and the at least one cage consist of bumps, the bumps are radially outward facing bumps and radially inward facing bumps, the bumps are formed in the partially spherical cavities of the at least one cage and extend radially towards an inside of the partially spherical cavities,
wherein the bumps and edges of a spherical surface are spaced apart by a distance of 0.15 mm (millimeter) and 3 mm, the spherical surface delimits at least one of the partially spherical cavities,
wherein thickness of the bumps with respect to the spherical surface has a value of between 0.05 mm and 0.5 mm, and
wherein difference between diameter of the spherical surface and diameter of the respective one of the at least one row of rolling bodies inserted inside the partially spherical cavity is less than 2.5 mm.

\* \* \* \* \*